(12) United States Patent
Choraku et al.

(10) Patent No.: US 9,188,743 B2
(45) Date of Patent: Nov. 17, 2015

(54) OPTICAL COUPLING STRUCTURE AND OPTICAL TRANSMISSION APPARATUS

(71) Applicant: FUJITSU LIMITED, Kawasaki-shi (JP)

(72) Inventors: Kohei Choraku, Yokohama (JP); Naoki Nakamura, Hachioji (JP); Akiko Matsui, Meguro (JP); Tetsuro Yamada, Kawasaki (JP); Yoshiyuki Hiroshima, Nakano (JP); Takahiro Ooi, Kawasaki (JP)

(73) Assignee: FUJITSU LIMITD, Kawasaki (JP)

( * ) Notice: Subject to any disclaimer, the term of this patent is extended or adjusted under 35 U.S.C. 154(b) by 278 days.

(21) Appl. No.: 13/736,477

(22) Filed: Jan. 8, 2013

(65) Prior Publication Data

US 2013/0243376 A1    Sep. 19, 2013

(30) Foreign Application Priority Data

Mar. 19, 2012  (JP) .................................. 2012-061873

(51) Int. Cl.
G02B 6/26  (2006.01)
G02B 6/42  (2006.01)

(52) U.S. Cl.
CPC ............... *G02B 6/26* (2013.01); *G02B 6/4214* (2013.01); *G02B 6/4232* (2013.01); *G02B 6/4245* (2013.01); *G02B 6/428* (2013.01)

(58) Field of Classification Search
None
See application file for complete search history.

(56) References Cited

U.S. PATENT DOCUMENTS 6,435,733 B1 *   8/2002  Parat et al. ...................... 385/88
2006/0187798 A1   8/2006  Ozawa et al.

FOREIGN PATENT DOCUMENTS

JP   2006-201508 A   8/2006
JP   2006-235115 A   9/2006
JP   2007-94212      4/2007

OTHER PUBLICATIONS

Jpoa - Office Action of Japanese Patent Application No. 2012-061873 dated Jul. 14, 2015, with English translation of the relevant part, p. 1, line 17 to p. 2, line 3 of the Office Action. ** JP2006-235115 cited in the Jpoa was previously submitted in the Ids filed on Jan. 8, 2013, and considered by the Examiner on Dec. 21, 2014. X.

* cited by examiner

Primary Examiner — Ryan Lepisto
Assistant Examiner — Erin Chiem
(74) Attorney, Agent, or Firm — Fujitsu Patent Center

(57) ABSTRACT

An optical coupling structure includes a light source that emits light; and an optical waveguide that has on a given end, a mirror surface that reflects the light emitted from the light source, the optical waveguide guiding the light reflected by the mirror surface to another end. In the optical coupling structure, a traveling direction of the light emitted from the light source is inclined toward the given end of the optical waveguide and is, with respect to a normal line of the mirror surface, at an angle that is greater than 45 degrees and that satisfies a condition for complete reflection of light on the mirror surface and a condition for complete reflection of light in the optical waveguide.

8 Claims, 7 Drawing Sheets

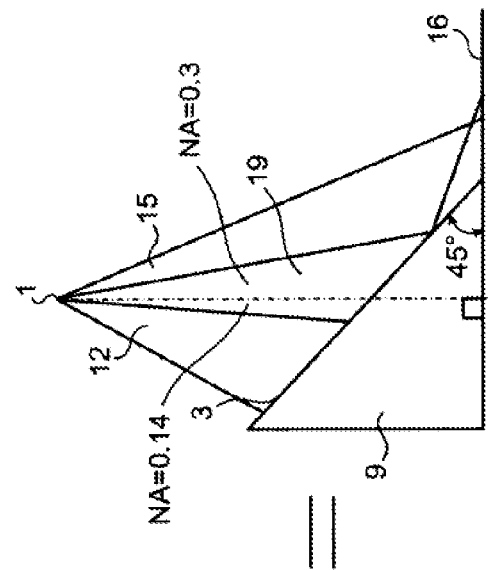
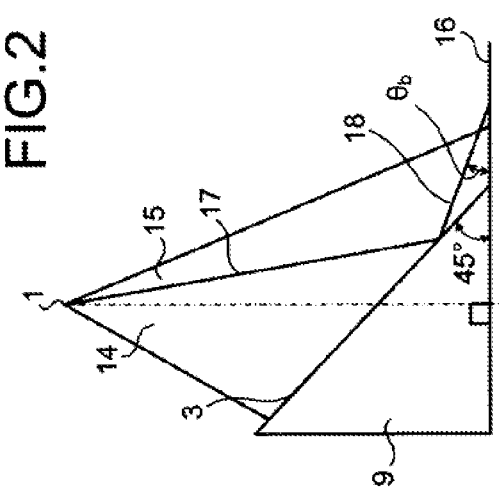
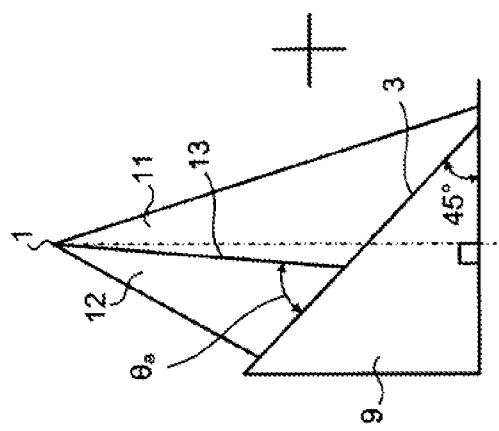
FIG.2

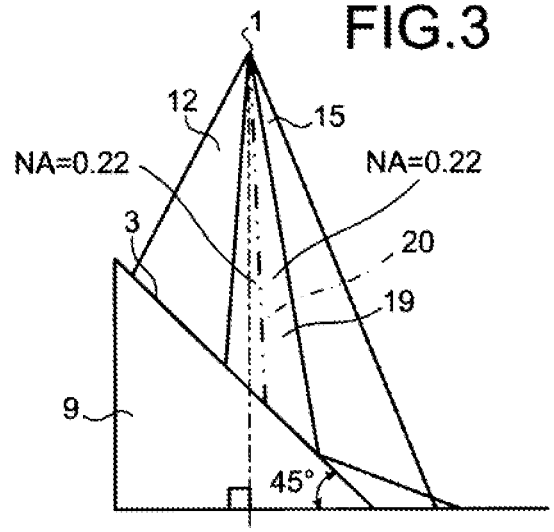
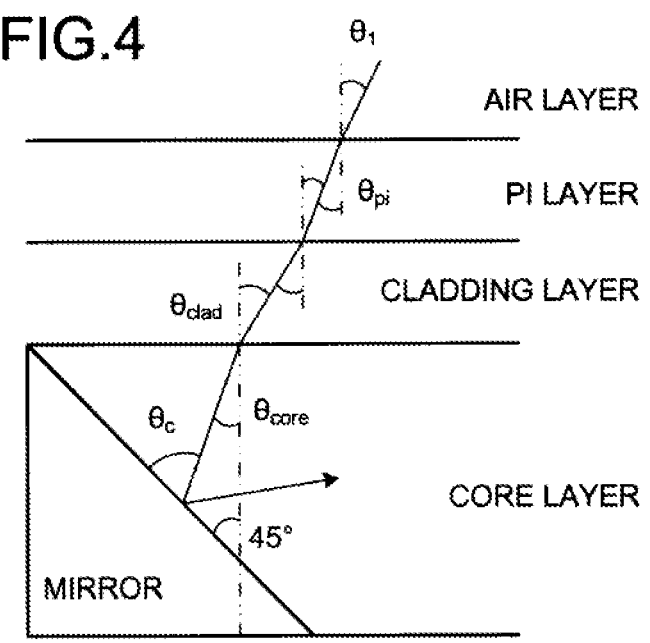

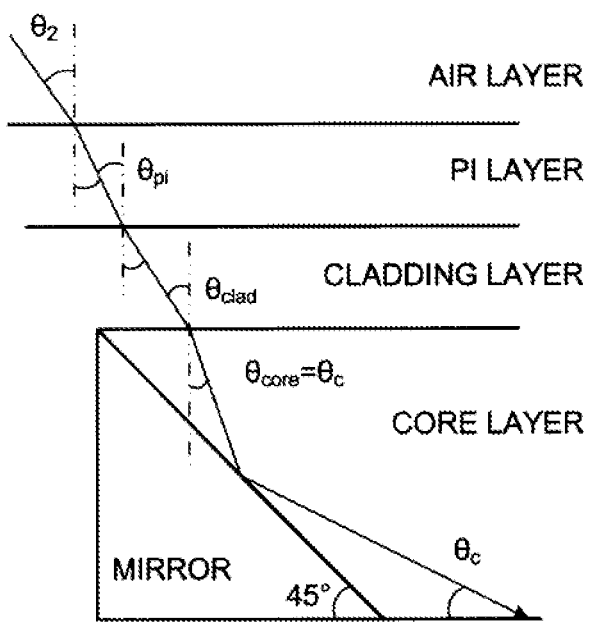
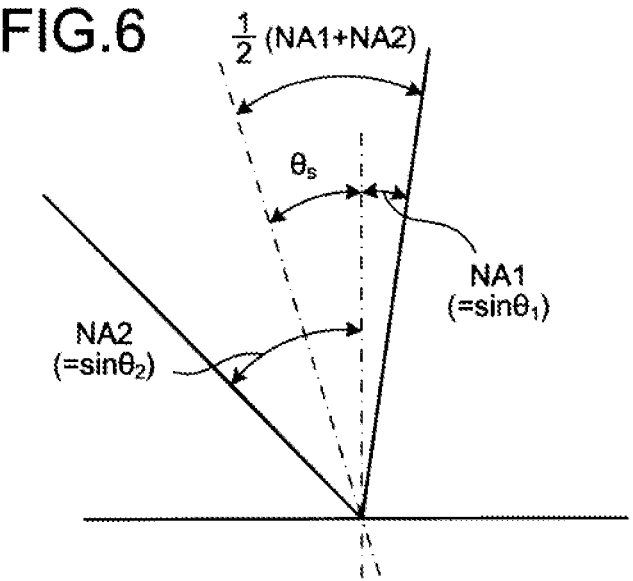

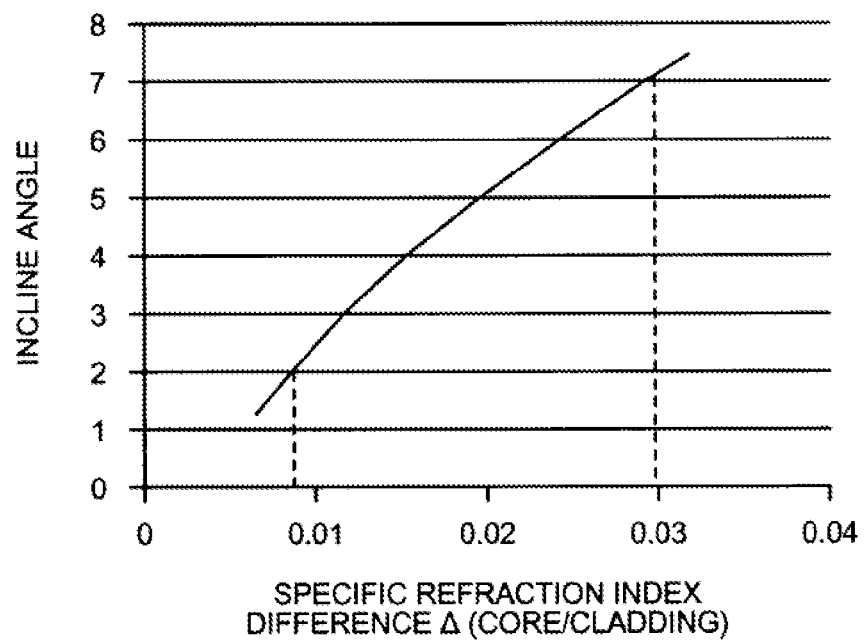
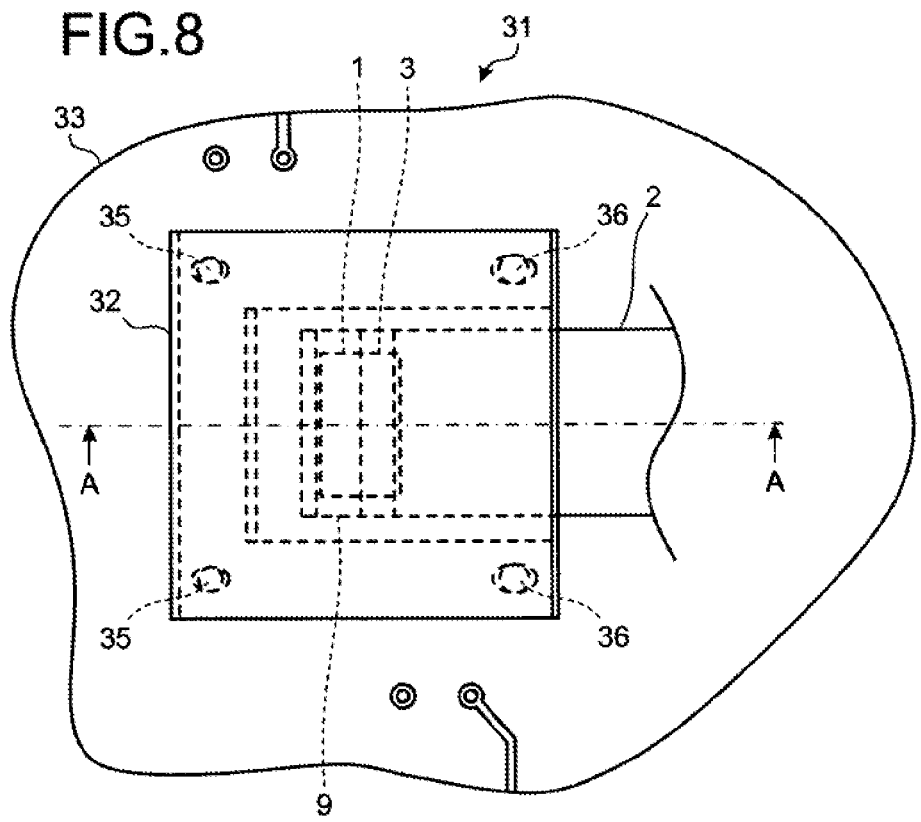

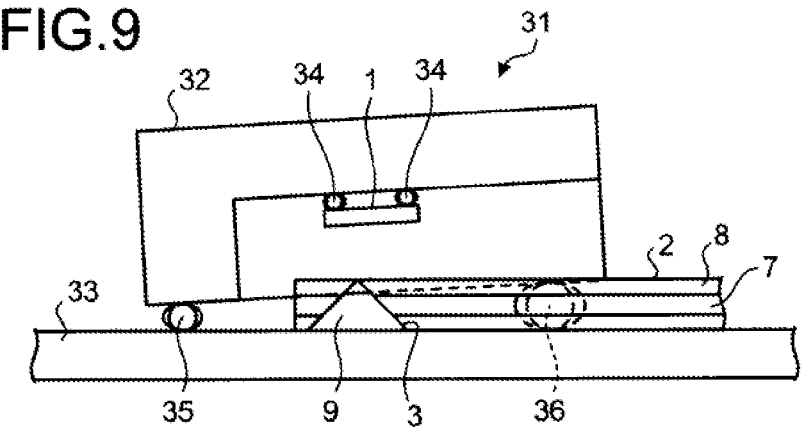
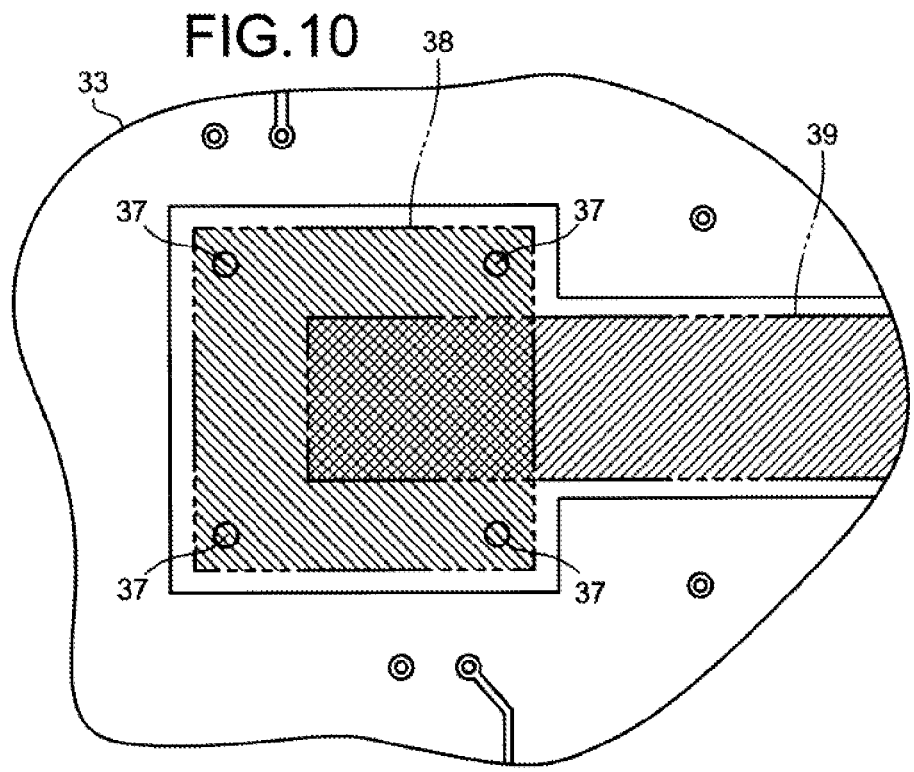
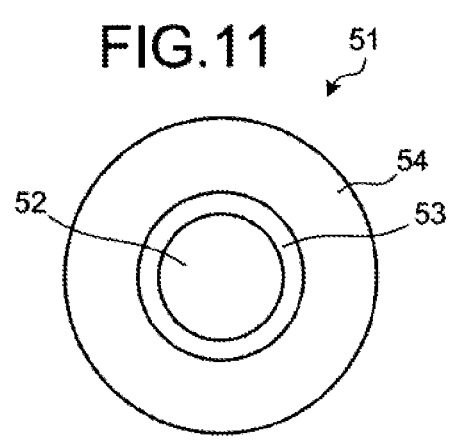

OPTICAL COUPLING STRUCTURE AND OPTICAL TRANSMISSION APPARATUS

CROSS REFERENCE TO RELATED APPLICATIONS

This application is based upon and claims the benefit of priority of the prior Japanese Patent Application No. 2012-061873, filed on Mar. 19, 2012, the entire contents of which are incorporated herein by reference.

FIELD

The embodiment discussed herein is related to an optical coupling structure and an optical transmission apparatus.

BACKGROUND

Conventionally, in an optical circuit, light output from an optical waveguide falls onto a mirror tilted at 45 degrees and is reflected by the mirror (see, e.g., Japanese Laid-Open Patent Publication No. 2006-201508). Further, a conventional optical signal input device has a structure such that the optical axis of a condensing lens that condenses parallel light output from a collimator lens onto the entrance of an optical waveguide is shifted relative to the optical axis of the collimator lens (see, e.g., Japanese Laid-Open. Patent Publication No. 2006-235115).

To suppress loss in an optical coupling structure that causes light reflected by a mirror tilted at 45 degrees to fail, onto an optical waveguide, it is necessary to cause the light to be reflected by the mirror surface and to cause the light entering the optical waveguide to be completely reflected by an interface between the core and the cladding of the optical waveguide. However, even if the incident position or angle of light is not shifted relative to the mirror surface, transmission loss consequent to light passing through the mirror inevitably results.

According to a trial calculation by a photoelectromagnetic field analysis based on the finite difference time domain (FDTD) method, such optical transmission loss is calculated at approximately 0.3 dB. This analysis value is given on the condition that a core-cladding specific refractive index difference $\Delta$ is set to about 1.9% and the numerical aperture (NA) of a light source is set to 0.2. Elements other than the mirror also cause loss, and the loss caused by the mirror must be reduced to almost zero in an ultra-high-frequency band in which, for example, the optical transmission speed is 40 Gbps or higher. With consideration these factors, the suppression of transmission loss caused by the mirror arises as a problem to foe addressed.

SUMMARY

According to an aspect of an embodiment, an optical coupling structure includes a light source that emits light; and an optical waveguide that has on a given end, a mirror surface that reflects the light emitted from the light source, the optical waveguide guiding the light reflected by the mirror surface to another end. In the optical coupling structure, a traveling direction of the light emitted from the light source is inclined toward the given end of the optical waveguide and is, with respect to a normal line of the mirror surface, at an angle that is greater than 45 degrees and that satisfies a condition for complete reflection of light on the mirror surface and a condition for complete reflection of light in the optical waveguide.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 2 and 3 are diagrams for explaining the numerical aperture of a mirror;

FIG. 4 is a diagram for explaining an incline angle that satisfies a condition for complete reflection by the mirror;

FIG. 5 is a diagram for explaining an incline angle that satisfies a condition for complete reflection by a waveguide;

FIG. 6 is a diagram of the relation between an incline angle $\theta_s$ and a numerical aperture satisfying the condition for complete reflection by the mirror and a numerical aperture satisfying the condition for complete reflection by the waveguide;

FIG. 7 is a diagram depicting the relation between the incline angle and the specific refraction index difference between the core and cladding;

FIG. 8 is a top view of an example of an optical transmission apparatus to which the optical coupling structure of FIG. 1 is applied;

FIG. 9 is a sectional view of an example of a section of the optical transmission apparatus of FIG. 8 along a line A-A;

FIG. 10 is a top view of a substrate to which the transmission apparatus of FIGS. 8 and 9 is mounted;

FIG. 11 is a sectional view of a resin core solder ball;

DESCRIPTION OF EMBODIMENTS

Figure 1:
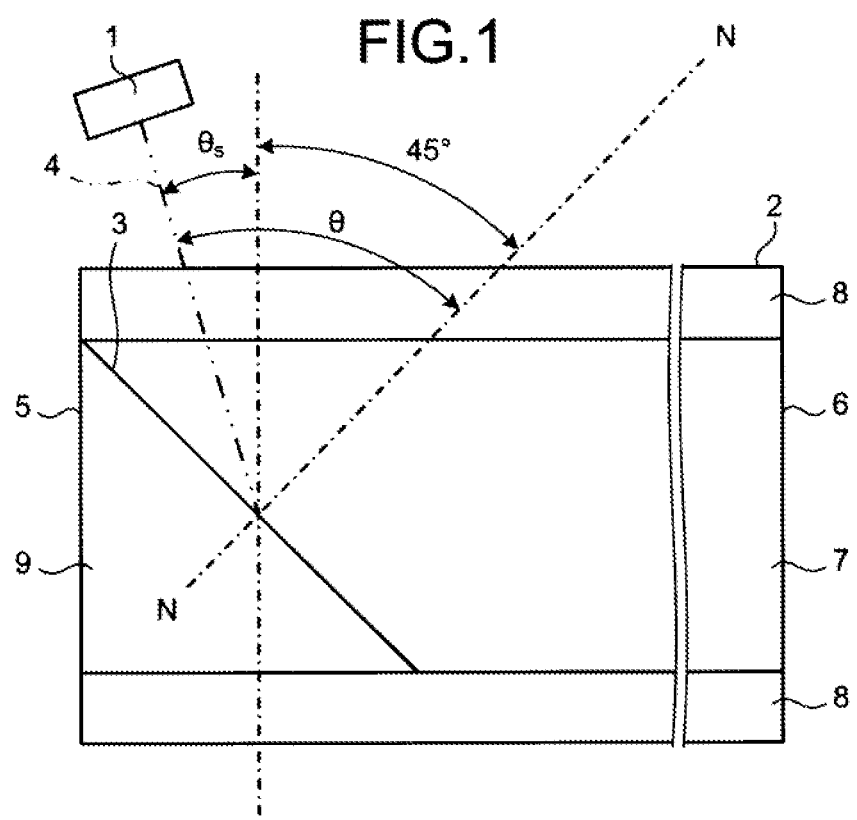
FIG. 1 is an explanatory diagram of an optical coupling structure according to an embodiment.

Preferred embodiments of an optical coupling structure and an optical transmission apparatus will be described in detail with reference to the accompanying drawings. In each the description of the embodiments, identical constituent elements will be given the same reference numeral and redundant explanation will be omitted.

FIG. 1 is an explanatory diagram of an optical coupling structure according to an embodiment. As depicted in FIG. 1, the optical coupling structure includes a light source 1 and an optical waveguide 2. The light source 1 emits light. The optical waveguide 2 has a mirror surface 3 at a given end 5, where the mirror surface 3 reflects light emitted from the light source 1. The optical waveguide 2 guides light reflected by the mirror surface 3 to the other end 6.

The traveling direction of light 4 emitted from the light source 1 (which is indicated by a two-dot chain line in FIG. 1) is inclined toward the given end 5 of the optical waveguide 2 to make an angle $\theta$ that is greater than 45 degrees with respect to the normal line of the mirror surface 3 (single-dot chain line N-N). The traveling direction of the light 4 emitted from the light source 1 is inclined to make, with respect to the normal line of the mirror surface 3, the angle $\theta$ that satisfies a condition for complete reflection of the light 4 on the mirror surface 3 (condition 1). The traveling direction of the light 4 emitted from the light source 1 is inclined to make, with respect to the normal line N-N of the mirror surface 3, the angle θ that satisfies a condition for complete reflection of the light 4 in the optical waveguide 2 (condition 2).

The optical waveguide 2 has a core 7 and cladding 8 encompassing the core 7. The core 7 is made of a translucent material. Translucent materials that are used as the core 7 include, for example, quartz glass, silicon, and polyimide-based resin. The cladding 8 has a refraction index less that is than that of the core 7.

In the optical waveguide 2, the light 4 reflected by the mirror surface 3 fails onto an interface between the core 7 and the cladding 3 at an angle greater than a critical angle. As a result, the light 4 is completely reflected by the interface between the core 7 and the cladding 8 and travels from the mirror surface 3 to the other end 6 of the optical waveguide 2. The angle θ satisfying condition 2 above is, therefore, an angle that causes the light 4 reflected by the mirror surface 3 to fall onto the interface between the core 7 and the cladding 8, at an angle greater than the critical angle.

The mirror 9 may be a mirror tilted at 45 degrees with the mirror surface 3 tilted at 45 degrees with respect to, for example, the direction in which light is guided by the optical waveguide 2. The refractive index of the mirror 9 is less than that of the core 7 of the optical waveguide 2. The light A emitted from the light source 1 travels through the cladding 8 and the core 7 of the optical waveguide 2 to fail onto the mirror surface 3. The light 4 having traveled through the core 7 falls onto the mirror surface 3 at an angle greater than the critical angle. As a result, the light 4 is completely reflected by the mirror surface 3. The angle θ satisfying condition 1 above is, therefore, an angle that causes the light 4 to fall onto the mirror surface 3 at an angle greater than the critical angle.

FIGS. 2 and 3 are diagrams for explaining the numerical aperture of the mirror that is determined by conditions 1 and 2. As depicted in FIG. 2, from condition 1, a propagation area 11 and a loss area 12 are determined. If light emitted from the light source 1 travels through the propagation area 11 to fall onto the mirror surface 3, loss does not result when the light is reflected by the mirror surface 3. If the light travels through the loss area 12 to fall onto the mirror surface 3, loss results when the light is reflected by the mirror surface 3.

An angle $θ_a$ that an interface 13 between the propagation area XI and the loss area 12 makes with the mirror surface 3 is an angle given by subtracting [a critical angle between the mirror 9 and the core of the optical waveguide] from 90 degrees. In the propagation area 11, therefore, the incident angle of the light to the mirror surface 3 becomes greater than or equal to the critical angle. In contrast, in the loss area 12, the incident angle of the light to the mirror surface 3 becomes less than the critical angle.

From condition 2, a propagation area 14 and a loss area 15 are determined. If light emitted from the light source 1 travels through the propagation area 14 to fall onto the mirror surface 3, loss does not result when the light reflected by the mirror 3 is reflected by the interface 16 between the core and the cladding of the optical waveguide. If the light travels through the loss area 15 to fall onto the mirror surface 3, loss results when the light reflected by the mirror 3 is reflected by the interface 16 between the core and the cladding of the optical waveguide.

An angle $θ_b$ that the traveling direction of light 18 having traveled along an interface 17 between the propagation area 14 and the loss area 15 and having been reflected by the mirror surface 3 makes with the interface 16 between the core and the cladding of the optical waveguide is an angle given by subtracting [a critical angle between the core and the cladding of the optical waveguide] from 90 degrees. In the propagation area 14, therefore, the incident angle of the light to the interface 16 between the core and the cladding of the optical waveguide becomes greater than the critical angle. In contrast, in the loss area 15, the incident angle of the light to the interface 16 between the core and the cladding of the optical waveguide becomes less than the critical angle.

By summing the propagation area 11 and the loss area 12 based on condition 1 and the propagation areas 14 and the loss area 15 based on condition 2, a propagation area 19 satisfying both conditions 1 and 2 is determined. The numerical aperture MA of the mirror 9 in the propagation area 19 satisfying both conditions 1 and 2 is determined to be 0.14 in the propagation area 11 based on condition 1, and is determined to be 0.3 in the propagation area 14 based on condition 2. This means that satisfying condition 1, i.e., a condition for complete reflection of the light on the mirror surface 3, is more difficult. When a light source with the numerical aperture NA of, for example, about 0.2 is used, satisfying the condition 1 is difficult, in which case loss results when light is completely reflected on the mirror surface.

The inventors diligently studied how to enlarge the numerical aperture MA determined by the propagation area 11 based on condition 1 and reached the conclusion that, for example, the traveling direction of light 20 emitted from the light source 1 (the optical axis is indicated by a two-dot chain line in FIG. 3) should be inclined so that the light 20 travels through the propagation area 19, which satisfies conditions 1 and 2, and makes an angle θ of 45 degrees or greater with respect to the normal line of the mirror surface 3.

By inclining the direction of the light 20 in this manner, the numerical aperture NA of the mirror 9 in the propagation area 19 satisfying both conditions 1 and 2 can be determined to be, for example, 0.22 in the propagation area 11 based on condition 1, and determined to be, for example, 0.22 in the propagation area 14 based on condition 2. In this case, even if a light source with a numerical aperture MA of, for example, about 0.2 is used, loss does not result when the light is completely reflected by the mirror surface 3.

An incline angle $θ_s$ of the light emitted from the light source 1 will be described. The incline angle $θ_s$ is, as depicted in FIG. 1, an angle with respect to a 0 degrees direction, which is defined such that a direction making an angle of 45 degrees with respect to the normal line of the mirror surface 3 (single-dot chain line N-N) is 0 degrees.

When the incident angle of light to a reflection surface is [90 degrees−$θ_c$], a condition for complete reflection of the light is expressed by equation (3), where Δ denotes a specific refractive index difference.

$$\sin θ_c = \sqrt{2Δ} \qquad (3)$$

FIG. 4 is a diagram for explaining an incline angle that satisfies condition 1. As depicted in FIG. 4, the incline angle of the light emitted from the light source is $θ_1$. The incident angle of light from an air layer and incident on a polyimide (PI) layer is $θ_1$, and the angle of refraction of the PI layer is $θ_{pi}$. The incident angle of light from the PI layer and incident on the cladding layer of the optical waveguide is $θ_{pi}$, and the angle of refraction of the cladding layer is $θ_{clad}$. The incident angle of light from the cladding layer and incident on the core layer of the optical waveguide is $θ_{clad}$, and the angle of refraction of the core layer is $θ_{core}$. The incident angle to the mirror is [90 degrees−$θ_c$].

From Snell's law, equation (4) is derived, where the refractive index of the air layer is 1, $n_{pi}$ denotes the refractive index of the PI layer, $n_{clad}$ denotes the refractive index of the cladding layer, and $n_{clad}$ denotes the refractive index of the core layer.

$$1 \cdot \sin\theta_1 = n_{pi}\sin\theta_{pi} = n_{clad}\sin\theta_{clad} = n_{core}\sin\theta^{core} \quad (4)$$

From FIG. 4, $\theta_{core}$ is given by equation (5). Hence, equation (6) is derived from equations (4) and (5), $$\theta_{core} = \theta_c - 45° \quad (5)$$

$$\sin\theta_1 = n_{core}\sin(\theta_c - 45°) \quad (6)$$

When a specific refraction index difference between the mirror and the core layer is $\Delta_1$, it follows from equation (3) that a condition for complete reflection of light on the mirror surface is given by equation (7). Substituting equation (7) into equation (6) yields equation (8).

$$\theta_c = \sin^{-1}\sqrt{2\Delta_1} \quad (7)$$

$$\sin\theta_1 = n_{core}\sin(\sin^{-1}\sqrt{2\Delta_1} - 45°) = NA1 \quad (8)$$

FIG. 5 is a diagram for explaining an incline angle that satisfies condition 2. As depicted in FIG. 5, the incline angle of light emitted from the light source is $\theta_2$. The incident angle of light from the air layer and incident on the polyimide (PI) layer is $\theta_2$, the angle of refraction of the PI layer and the incident angle of light from the PI layer and incident on the cladding layer of the optical waveguide are both $\theta_{pi}$, the angle of refraction of the cladding layer and the incident angle of light from the cladding layer and incident on the core layer of the optical waveguide are both $\theta_{clad}$, and the angle of refraction of the core layer is $\theta_{core}$. The incident angle to the interface between the core layer and the cladding layer is [90 degrees−$\theta_c$].

From Snell's law, equation (9) is derived, where the refractive index of the air layer is 1, $n_{pi}$ denotes the refractive index of the PI layer, $n_{clad}$ denotes the refractive index of the cladding layer, and $n_{core}$ denotes the refractive index of the core layer.

$$1 \cdot \sin\theta_2 = n_{pi}\sin\theta_{pi} = n_{clad}\sin\theta_{clad} = n_{core}\sin\theta_{core} \quad (9)$$

From FIG. 5, $\theta_{core}$ is given by equation (10). Hence, equation (11) is derived from equations (9) and (10).

$$\theta_{core} = \theta_c \quad (10)$$

$$\sin\theta_2 n_{core}\sin\theta_c \quad (11)$$

When a specific refraction index difference between the core layer and the cladding layer is $\Delta_2$, it follows from equation (3) that a condition for complete reflection of light on the interface between the core layer and the cladding layer is given by equation (12). Substituting equation (12) into equation (11) yields equation (13).

$$\sin\theta_c = \sqrt{2\Delta_2} \quad (12)$$

$$\sin\theta_c = n_{core}\sqrt{2\Delta_2} = NA2 \quad (13)$$

FIG. 6 is a diagram of the relation between the incline angle $\theta_s$ and a numerical, aperture satisfying condition 1 and a numerical aperture satisfying condition 2. As depicted in FIG. 6, from the relation between the incline angle $\theta_s$ and a numerical aperture NA1 satisfying condition 1 and a numerical aperture NA2 satisfying condition 2, equation (14) is derived.

$$\sin\theta_s = \tfrac{1}{2}(NA1 + NA2) - NA1 \quad (14)$$

The specific refraction index difference $\Delta_2$ between the core layer and the cladding layer changes depending on the incline angle $\theta_s$. An example of the relation between the specific refraction index difference $\Delta_s$ and the incline angle $\theta_s$ is shown in FIG. 7, which depicts the relation in a case of the refraction index of the mirror being 1 and the refraction index of the core layer being 1.55.

The incline angle $\theta_s$ is derived from equation (14). Hence, the angle $\theta$ that the traveling direction of the light 4 emitted from the light source 1 (two-dot chain line) makes with the normal line of the mirror surface 3 (single-dot chain line N-N) in the optical coupling structure of FIG. 1 is expressed by equation (15).

$$\theta = \sin^{-1}\{\tfrac{1}{2}(NA2 - NA1)\} + 45° \quad (15)$$

The angle θ may be an angle of 47 degrees or more to 52 degrees or less with respect to the normal line of the mirror surface 3. If the angle θ is less than 47 degrees, the numerical aperture NA determined by the propagation area 11 based on the condition for complete reflection on the mirror surface 3 becomes less than, for example, the numerical aperture of the light source 1, in which case transmission loss at the mirror surface results. If the angle θ is greater than 52 degrees, the numerical aperture NA determined by the propagation area 14 based on the condition for complete reflection in the optical waveguide 2 becomes less than, for example, the numerical aperture of the light source 1, in which case transmission loss at the mirror surface results. It is preferable, therefore, that the angle θ be 47 degrees or more to 52 degrees or less. Such an angle θ can suppress the occurrence of transmission loss at the mirror surface.

According to the optical coupling structure of FIG. 1, by inclining the traveling direction of the light 4 emitted from the light source 1 at the angle satisfying the condition for complete reflection on the mirror surface 3 and the condition for complete reflection in the optical waveguide 2, limits on the numerical aperture of the mirror surface 3 determined by the condition for complete reflection on the mirror surface 3 can be eased. Consequently, part of the light 4 incident on the mirror surface 3 is prevented from passing though the mirror surface 3, whereby transmission loss of the light 4 reflected by the mirror surface 3 is suppressed.

FIG. 8 is a top view of an example of an optical transmission apparatus to which the optical coupling structure of FIG. 1 is applied. FIG. 9 is a sectional view of an example of a section of the optical transmission apparatus of FIG. 8 along a line A-A. FIG. 10 is a top view of a substrate to which the transmission apparatus of FIGS. 8 and 9 is mounted.

As depicted in FIGS. 8 and 9, an optical transmission apparatus 31 includes the light source 1, the optical waveguide 2, a support member 32, and a substrate 33. The light source 1 and the optical waveguide 2 are the same light source 1 and the optical waveguide 2 of the optical coupling structure depicted in FIG. 1 as described above. The optical coupling structure made up of the light source 1, the mirror surface 3, and the optical waveguide 2 is the same optical coupling structure depicted in FIG. 1 as described above. The light source 1 may be provided as, for example, a vertical cavity surface emitting laser (VCSEL) light source.

The mirror surface 3 may be fabricated into a surface such that at least an end face of the core 7 makes an incline angle of 45 degrees at a given end of the optical waveguide 2. In other words, the mirror 9 may be an air mirror where air serves as a medium.

The support member 32 has an eaves-shaped overhanging, for example, above the mirror surface 3. The light source 1 is fixed, by first conductive members 34, to a surface of the eaves part of the support member 32, opposing the mirror surface 3. The light source 1 is attached to the support member 32 such that the light source 1 can emit light toward the mirror surface 3. The support member 32 is provided with signal lines and various circuit components (not depicted)

that transmit electrical signals to the light source 1. The first conductive members 34 electrically connect pads (not depicted) disposed on the light source 1 to pads (not depicted) disposed on the support member 32.

On the substrate 33, the support member 32 and the optical waveguide 2 are mounted. The support member 32 is fixed to the substrate 33 by second conductive members 35 and 36. The substrate 33 has signal lines and various circuit components (not depicted) that transmit electrical signals to the support member 32. The second conductive members 35 and 36 electrically connect the pads (not depicted) disposed on the support member 32 to pads (see FIG. 10) disposed on the substrate 33.

As depicted in FIG. 10, the substrate 33 is provided with the pads 37 electrically connected to the pads of the support member 32 via the second conductive members 35 and 36. The pads 37 may be placed on, for example, four corners of a placement area 38 for the square support member. In FIG. 10, an area extending rightward from the center of the placement area 38 for the support member is a placement area 39 for the optical waveguide.

As depicted in FIGS. 8 and 9, the conductive members 35 and 36 electrically connecting and fixing the support member 32 to the substrate 33 may be different in thickness from each other. For example, with respect to the mirror surface 3, the second conductive members 36 located on the side where the optical waveguide 2 extends (right side in FIG. 9) are thicker than the second conductive members 35 located on the side where the optical waveguide 2 does not exist (left side in FIG. 9), thereby causing the support member 32 to tilt with respect to the substrate 33 and thus, tilting the light source 1 so that the angle that the normal line of the mirror surface 3 makes with the traveling direction of light emitted from the light source 1 is an angle satisfying equation (15) or an angle of 47 degrees or more to 52 degrees or less.

FIG. 11 is a sectional view of a resin core solder ball. The resin core solder ball is an example of the first conductive members 34 and second conductive members 35. As depicted in FIG. 11, the resin core solder ball 51 is made by, for example, coating the surface of a spherical resin core ball 52 with a copper layer 53 and further coating the exterior of the copper layer 53 with a solder layer 54. One example of the resin core solder ball is Micropearl (registered trademark) produced by SEKISUI CHEMICAL CO., LTD.

When the second conductive members 35 and 36 are the resin core solder balls, the diameter of the resin core solder balls (second conductive members 35) on the left side and the diameter of the resin core solder balls (second conductive members 36) on the right side in FIG. 9 are selected suitably so that the light source 1 tilts at the desired angle above. In FIGS. 8 and 9, the central circular portions of the second conductive members 35 and 36 represent core balls, and bulging portions around the exterior of the circular portions represent solder (similarly in FIG. 12).

According to the optical transmission apparatus 31 of FIG. 5, to which the optical coupling structure of FIG. 1 is applied, transmission loss of the light 4 reflected by the mirror surface 3 can be suppressed. The second conductive members 35 and 36 fix the support member 32 set in a tilted position to the substrate 33 and also electrically connect the support member 32 to the substrate 33, thereby making it unnecessary to separately provide a member for fixing to the substrate 33, the support member 32 set in a tilted position and a member for electrically connecting the support member 32 to the substrate 33. Consequently, the number of components is reduced as is the cost.

Figure 12:
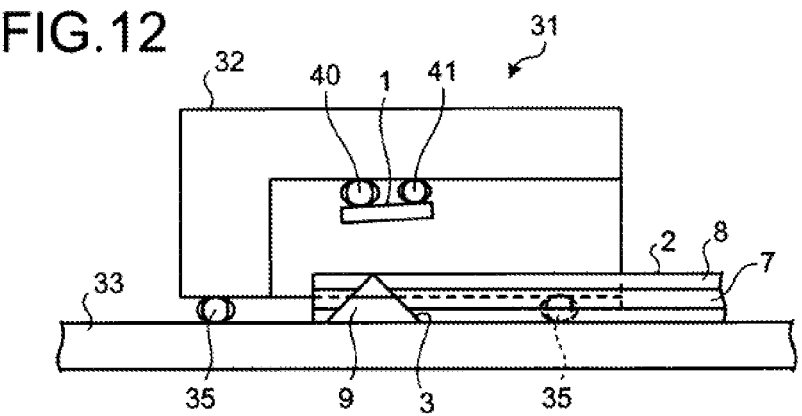
FIG. 12 is a sectional view of another example of a section of the optical transmission apparatus of FIG. 8 along the line A-A.

FIG. 12 is a sectional view of another example of a section of the optical transmission apparatus of FIG. 5 along the line A-A. As depicted in FIG. 12, configuration may be such that the light source 1 is fixed to the support member 32 using resin core solder balls 40 and 41 different in diameter from each other and the support member 32 is fixed to the substrate 33 using resin core solder balls identical in diameter to each other (second conductive members 35). The light source 1 may be tilted at the desired angle in this configuration. The light source 1 may be tilted at the desired angle in a configuration such that the light source 1 is fixed to the support member 32 using resin core solder balls different in diameter from each other and the support member 32 is fixed to the substrate 33 using the resin core solder balls different in diameter from each other.

According to the optical transmission, apparatus 31 of FIG. 12, tilting the light source 1 with respect to the support member 32 also achieves the same effect as the transmission apparatus 31 of FIG. 9.

Figure 13:
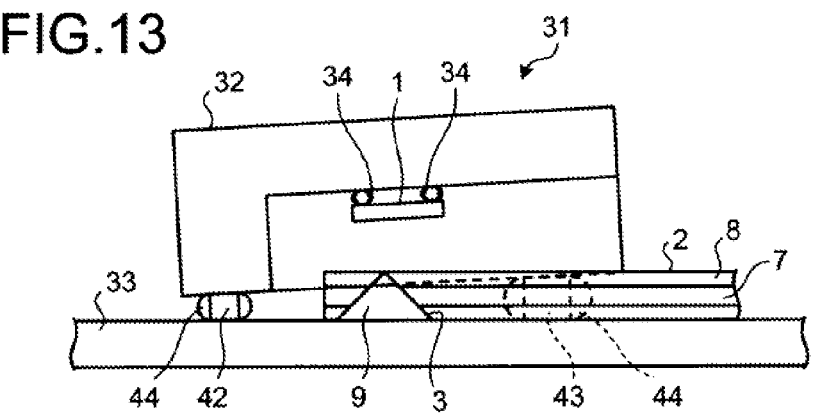
FIG. 13 is a sectional view of another example of a section of the optical transmission apparatus of FIG. 8 along the line A-A.

FIG. 13 is a sectional view of another example of a section of the optical transmission apparatus of FIG. 8 along the line A-A. In the example of FIG. 13, conductive films 42 and 43, such as copper films, and solder 44 are used in place of the resin core solder balls as the second conductive members 35 and 36 of FIG. 9. As depicted in FIG. 13, the light source 1 may be tilted at the desired angle in a configuration such that the support member 32 is fixed to the substrate 33 using the solder 44 and the conductive films 42 and 43 different in thickness from each other.

According to the optical transmission apparatus 31 of FIG. 13, tilting the support member 32 with respect to the substrate 33 using the conductive films in place of the resin core solder balls also achieves the same effect as the transmission apparatus 31 of FIG. 9.

Figure 14:
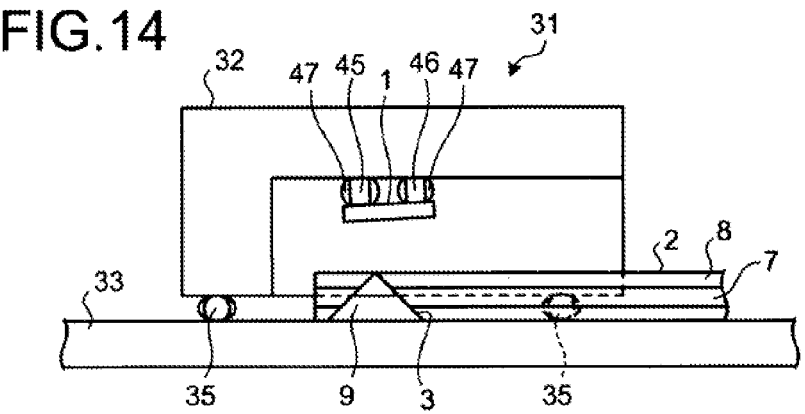
FIG. 14 is a sectional view of another example of a section of the optical transmission apparatus of FIG. 8 along the line A-A.

FIG. 14 is a sectional view of another example of a section of the optical transmission apparatus of FIG. 8 along the line A-A. In the example of FIG. 14, conductive films 45 and 46, such as copper films, and solder 47 are used in place of the resin core solder balls 40 and 41 of the example of FIG. 12. As depicted in FIG. 14, the light source 1 may be tilted at the desired angle in a configuration such that the light source 1 is fixed to the support member 32 using the solder 47 and the conductive films 45 and 46 different in thickness from each other.

According to the optical transmission apparatus 31 of FIG. 14, tilting the light source 1 with respect to the support member 32, using the conductive films in place of the resin core solder balls also achieves the same effect as the transmission apparatus 31 of FIG. 9.

According to the optical coupling structure and the optical transmission apparatus, transmission loss caused by a mirror can be suppressed.

All examples and conditional language provided, herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present, invention have been described in detail, it should be understood that the various changes, substitutions, and alterations could be made hereto without departing from the spirit and scope of the invention.

What is claimed is:

1. An optical transmission apparatus comprising:
a light source that emits light;
an optical waveguide that has at a given end, a mirror surface that reflects the light emitted from the light source, the optical waveguide guiding the light reflected by the mirror surface to another end;
a support member to which the light source is attached and that transmits an electrical signal to the light source; and
a substrate on which the support member and the optical waveguide are mounted and that transmits the electrical signal to the support member, wherein
the support member is fixed to the substrate using a plurality of conductive members that transmit the electrical signal from the substrate to the support member, and that differ in size such that
a traveling direction of the light emitted from the light source is inclined toward the given end of the optical waveguide and is, with respect to a normal line of the mirror surface, at an angle that is greater than 45 degrees and that satisfies a condition for complete reflection of light on the mirror surface and a condition for complete reflection of light in the optical waveguide.

2. The optical transmission apparatus according to claim 1, wherein
when a refractive index of a mirror having the mirror surface is $n_m$, a refractive index of a core of the optical waveguide is $n_{core}$, a refractive index of cladding of the optical waveguide is $n_{clad}$, and the angle is $\theta$, $\theta$ is expressed by equation (1):

$$\begin{cases} \theta = \sin^{-1}\left\{\frac{1}{2}(NA2 - NA1)\right\} + 45° \\ \text{Where,} \\ NA1 = n_{core}\sin\left(\sin^{-1}\sqrt{2\Delta_1} - 45°\right) \\ NA2 = n_{core}\sqrt{2\Delta_2} \\ \Delta_1 = \frac{n_{core}^2 - n_m^2}{2n_{core}^2} \\ \Delta_2 = \frac{n_{core}^2 - nclad^2}{2n_{core}^2} \end{cases}$$

3. The optical transmission apparatus according to claim 1, wherein
the angle is 47 degrees or more to 52 degrees or less with respect to the normal line of the mirror.

4. The optical transmission apparatus according to claim 1, wherein
the light source is fixed to the support member using a plurality of conductive members that transmit the electrical signal from the support member to the light source, and that
in size such that the traveling direction of the light emitted from the light source is at the angle.

5. An optical transmission apparatus comprising:
a light source that emits light;
an optical waveguide that has at a given end, a mirror surface that reflects the light emitted from the light source, the optical waveguide guiding the light reflected by the mirror surface to another end;
a support member to which the light source is attached and that transmits an electrical signal to the light source; and
a substrate on which the support member and the optical waveguide are mounted and that transmits the electrical signal to the support member, wherein
the light source is fixed to the support member using a plurality of conductive members that transmit the electrical signal from the support member to the light source, and that differ in size such that a traveling direction of the light emitted from the light source is inclined toward the given end of the optical waveguide and is, with respect to a normal line of the mirror surface, at an angle that is greater than 45 degrees and that satisfies a condition for complete reflection of light on the mirror surface and a condition for complete reflection of light in the optical waveguide.

6. The optical transmission apparatus according to claim 5, wherein
when a refractive index of a mirror having the mirror surface is $n_m$, a refractive index of a core of the optical waveguide is $n_{core}$, a refractive index of cladding of the optical waveguide is $n_{clad}$, and the angle is $\theta$, $\theta$ is expressed by equation (2):

$$\begin{cases} \theta = \sin^{-1}\left\{\frac{1}{2}(NA2 - NA1)\right\} + 45° \\ \text{Where,} \\ NA1 = n_{core}\sin\left(\sin^{-1}\sqrt{2\Delta_1} - 45°\right) \\ NA2 = n_{core}\sqrt{2\Delta_2} \\ \Delta_1 = \frac{n_{core}^2 - n_m^2}{2n_{core}^2} \\ \Delta_2 = \frac{n_{core}^2 - nclad^2}{2n_{core}^2} \end{cases}$$

7. The optical transmission apparatus according to claim 5, wherein
the angle is 47 degrees or more to 52 degrees or less with respect to the normal line of the mirror.

8. The optical transmission apparatus according to claim 5, wherein
the support member is fixed to the substrate using a plurality of conductive members that transmit the electrical signal from the substrate to the support member, and that differ in size such that the traveling direction of the light emitted from the light source is at the angle.

* * * * *